United States Patent
Horiguchi (10) Patent No.: US 8,264,682 B2
(45) Date of Patent: Sep. 11, 2012

(54) OPTICAL SPECTRUM ANALYZER

(75) Inventor: Atsushi Horiguchi, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 0 days.

(21) Appl. No.: 13/092,305

(22) Filed: Apr. 22, 2011

(65) Prior Publication Data
US 2011/0261357 A1    Oct. 27, 2011

(30) Foreign Application Priority Data

Apr. 22, 2010   (JP) .................................. 2010-098708

(51) Int. Cl.
G01J 3/28    (2006.01)
(52) U.S. Cl. ........................................ 356/328; 356/334
(58) Field of Classification Search .................. 356/328, 356/334
See application file for complete search history.

(56) References Cited

U.S. PATENT DOCUMENTS

| | | | | |
|---|---|---|---|---|
| 4,776,695 A | * | 10/1988 | van Pham et al. | 356/334 |
| 5,784,159 A | * | 7/1998 | Iwasaki | 356/328 |
| 2007/0177141 A1 | * | 8/2007 | Ohishi et al. | 356/328 |
| 2009/0225315 A1 | * | 9/2009 | Wilt et al. | 356/328 |

FOREIGN PATENT DOCUMENTS

| | | |
|---|---|---|
| JP | 2000-314661 A | 11/2000 |
| JP | 2005-136796 A | 5/2005 |
| JP | 2007-205784 A | 8/2007 |
| WO | 02/088660 A1 | 11/2002 |

* cited by examiner

Primary Examiner — Kara E Geisel
(74) Attorney, Agent, or Firm — Westerman, Hattori, Daniels & Adrian, LLP (57) ABSTRACT

An optical spectrum analyzer includes a diffraction-grating control unit configured to change an angle of a diffraction grating to change a wavelength of a dispersed light beam extracted from incident light, a calculator unit configured to calculate an angle of the diffraction grating such that the wavelength of the dispersed light beam has a sampling wavelength, and to store the data indicating the angle, a FIFO memory configured such that part of the data is inputted to it, for outputting the data at each reception of a trigger signal indicating timing of sampling, and an FIFO memory control unit configured to output the subsequent data to the FIFO memory, when a remaining data amount of the FIFO memory reaches a predetermined value or lower.

5 Claims, 4 Drawing Sheets

OPTICAL SPECTRUM ANALYZER

CROSS-REFERENCE TO RELATED APPLICATION

This application is based on Japanese Patent Application No. 2010-098708 filed with the Japan Patent Office on Apr. 22, 2010, the entire content of which is hereby incorporated by reference.

BACKGROUND

1. Technical Field

The present application relates to an optical spectrum analyzer for measuring an optical spectrum of incident light by dispersing the incident light into a specific wavelength component and measuring the intensity of the dispersed light.

2. Related Art

Conventionally, an optical spectrum analyzer for measuring wavelength characteristics of an active device such as a laser apparatus has been known. The optical spectrum analyzer disperses inputted incident light with a diffraction grating set to an angle corresponding to a sampling wavelength inside a monochromator, and continuously measures the optical intensity. This enables an optical spectrum to be measured.

Figure 3:
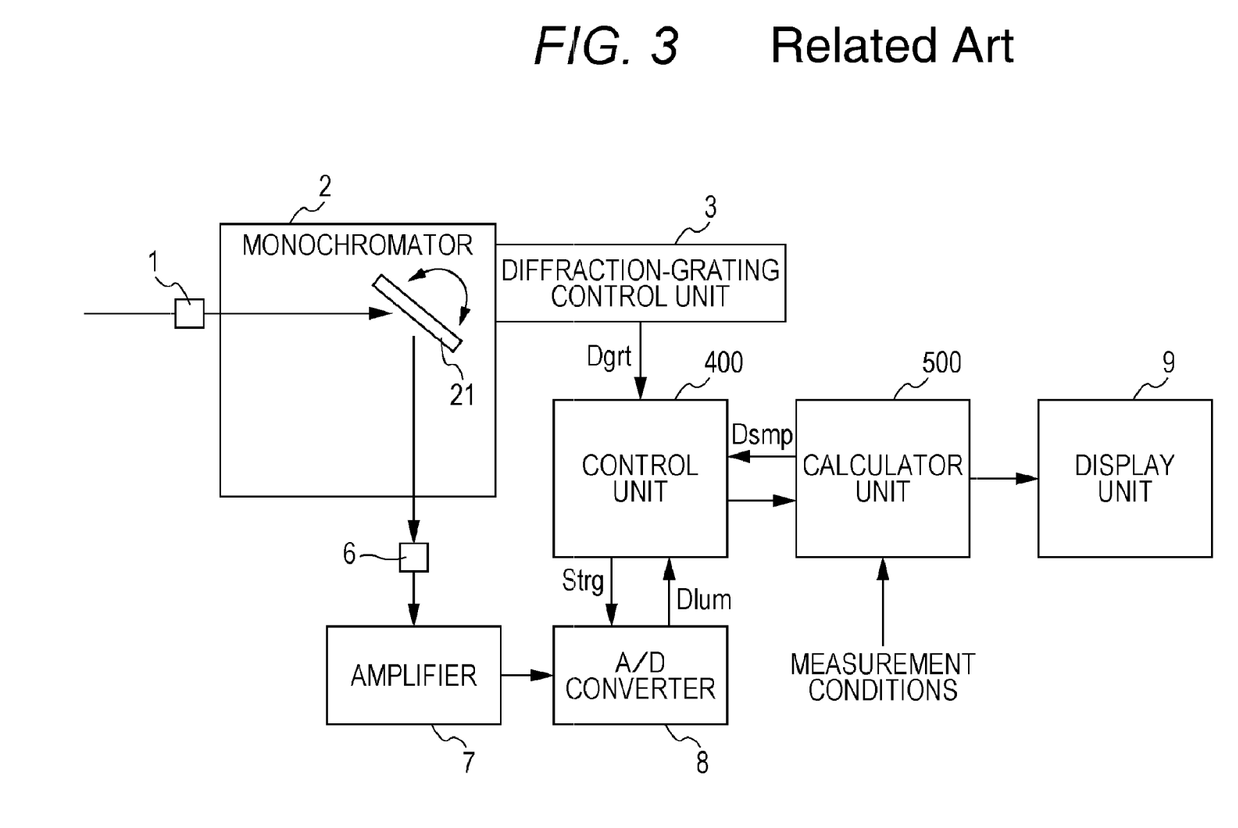
FIG. 3 illustrates a configuration diagram showing one example of a conventional optical spectrum analyzer.

FIG. 3 illustrates a configuration diagram showing one example of a conventional optical spectrum analyzer. This optical spectrum analyzer includes an input unit 1, a monochromator 2, a diffraction grating 21, an optical receiver 6, an amplifier 7, an A/D converter 8, a diffraction-grating control unit 3, a control unit 400, a calculator unit 500, and a display unit 9. To the monochromator 2 is inputted incident light from the input unit 1. The diffraction grating 21 is included inside the monochromator 2. The optical receiver 6 receives dispersed light beams obtained by the dispersion by the diffraction grating 21. The amplifier 7 amplifies the output of the optical receiver 6. The A/D converter 8 A/D-converts output of the amplifier 7 to thereby measure the optical intensity of the dispersed light beams. The diffraction-grating control unit 3 drives (rotates) the diffraction grating 21. The control unit 400 controls timing of sampling of the optical intensity for the dispersed light beams. The calculator unit 500 generates optical spectrum, based on sampled optical intensity data. The display unit 9 displays the generated optical spectrum.

The incident light, which is input from the input unit 1 to the monochromator 2, is dispersed by the diffraction grating 21 inside the monochromator 2. The dispersed light beams enter the optical receiver 6.

The wavelength of the dispersed light beams depends on the relative angle of the diffraction grating 21 with respect to the incident light. The calculator unit 500 calculates a target diffraction-grating angle corresponding to the sampling wavelength for acquiring the optical intensity, based on set measurement conditions such as sampling start/end wavelengths, the number of measurement points and the like. The calculator unit 500 writes, on a memory inside the control unit 400, the target diffraction-grating angle data (Dsmp) set before the measurement start.

The diffraction-grating control unit 3 drives the diffraction grating 21 in a range from an angle corresponding to the sampling start wavelength to an angle corresponding to the sampling end wavelength, and transmits a current diffraction-grating angle (Dgrt) to the control unit 400.

The control unit 400 compares the current diffraction-grating angle Dgrt inputted from the diffraction-grating control unit 3 and the target diffraction-grating angle stored on the memory. When the diffraction-grating angle Dgrt reaches the target diffraction-grating angle, the control unit 400 generates a trigger signal Strg indicating the timing of the sampling. The A/D converter 8 receives this trigger signal Strg and acquires optical intensity data Dlum at the time of the reception to transmit it to the control unit 400. The A/D converter 8 repeats this processing every time it receives the trigger signal Strg. This allows the control unit 400 to acquire the optical intensity data Dlum of all the sampling wavelengths.

The calculator unit 500 receives the optical intensity data Dlum through the control unit 400, and acquires optical spectrum data indicating wavelength versus optical intensity. The calculator unit 500 further applies correction of a level value to the acquired optical spectrum data to thereby generate display data and display this display data on the display unit 9.

Figure 4:
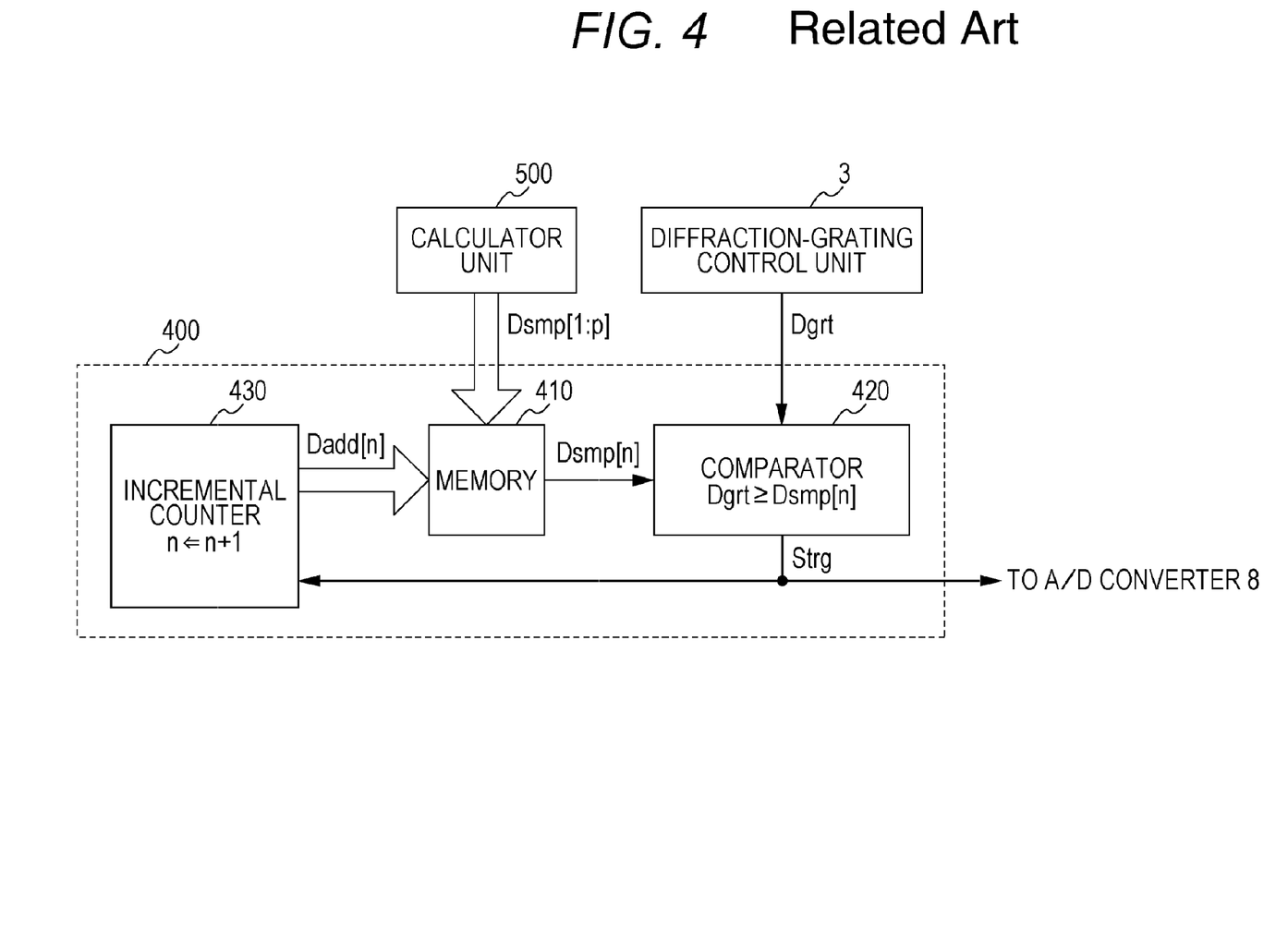
FIG. 4 illustrates a diagram showing a configuration of a control unit of the conventional example shown in FIG. 3.

FIG. 4 illustrates a diagram showing a configuration of the control unit 400. The control unit 400 includes a memory 410, a comparator 420, and an incremental counter 430 that specifies an address of the memory 410.

First, before the measurement start, the calculator unit 500 writes the plurality of pieces of target diffraction-grating angle data Dsmp in accordance with the plurality of measurement conditions in the memory 410 in order from an initial address. During the measurement, the incremental counter 430 specifies the address of the memory 410 from the initial address. The memory 410 outputs the data at the specified address to the comparator 420.

The comparator 420 compares the target diffraction-grating angle data Dsmp inputted from the memory 410 and the angle information Dgrt indicating the current angle of the diffraction grating 21. When the diffraction-grating angle Dgrt reaches the target diffraction-grating angle, the comparator 420 generates the trigger signal Strg. The trigger signal Strg is transmitted to the A/D converter 8 and the incremental counter 430. Upon receiving the trigger signal Strg, the incremental counter 430 increments a count value. Thereby, the address of the memory 410 to be specified is updated, so that the target diffraction-grating angle Dsmp to be outputted to the comparator 420 is updated. On the other hand, upon receiving the trigger signal Strg, the A/D converter 8 acquires the optical intensity Dlum corresponding to the sampling wavelength.

In this manner, the calculator unit 500 calculates all of the plurality of pieces of target diffraction-grating angle data Dsmp corresponding to the plurality of sampling wavelengths in accordance with the plurality of measurement conditions before the measurement start. The calculator unit 500 sequentially writes these pieces of data from the initial address on the memory 410 before the driving of the diffraction grating 21. This allows the trigger signal Strg to be sequentially generated at the timing corresponding to the sampling wavelengths during the driving of the diffraction grating 21. This enables the optical spectrum to be continuously measured by the number of measurement points set in advance.

In JP-A-2000-314661, the optical spectrum analyzer is described.

However, in order to attain a resolution of about 1 pm in the optical spectrum analyzer, an angular resolution of the diffraction grating 21 of about 0.16 seconds (1/8000000 rotations) is required. Therefore, in case where the sampling wavelength range is 1000 nm, diffraction-grating angle data Dsmp of 20 bits or more is required. Moreover, in case where the number of measurement points is set to 50001 points, a memory 410 of 1 Mbits or more is required to store the target diffraction-grating angle data. That is, the number of measurement points is limited by the capacity of the memory 410.

Moreover, the incremental counter 430 and the comparator 420 are made of logic circuitry such as an FPGA (Field Programmable Gate Array). On the other hand, to provide the memory 410 of 1 Mbits or more inside the FPGA, a large-capacity, expensive FPGA needs to be used. The memory 410 is thus made of a memory IC disposed outside the FPGA.

However, in this configuration, the memory 410 (memory IC) is controlled by the FPGA. Thus, as the memory 410, use of an expensive SRAM (Static Random Access Memory), which does not need refresh operation, is needed in place of an inexpensive DRAM (Dynamic Random Access Memory). Accordingly, the above-described configuration brings a cost increase.

Moreover, in the above-described configuration, the target diffraction-grating angle data Dsmp at all the measurement points needs to be written on the memory 410 before the measurement start. Thus, it takes time to start the measurement.

As another configuration, a configuration can also be considered, in which the target diffraction-grating angle data Dsmp is stored in the calculator unit 500, and in place of including the memory 410, a register of the same number of bits as that of the target diffraction-grating angle data Dsmp is included in the FPGA. In this configuration, every time one trigger signal Strg is generated, an interrupt is outputted to the calculator unit 500 to update the value of the register.

However, in this configuration, even when the connection between the control unit 400 and the calculator unit 500 is a Peripheral Component Interconnect (PCI) of 33 MHz, and interrupt processing is performed inside a PCI driver, about 8 µs as is required to recognize the interrupt. Furthermore, for the writing of the data, 1 µs is required.

The data acquisition time interval of the optical spectrum analyzer is at least about 50 µs. Accordingly, in this configuration, in the case that the data acquisition time interval is short as just described, the load on the calculator unit 500 is larger, because the interrupt processing is frequently performed. Thus, there is a possibility that a delay occurs in correction processing or rendering processing.

An object of one aspect of the present application is to realize an optical spectrum analyzer that can reduce costs and time required to start measurement by, for example, reducing hardware such as an SRAM, and can shorten a data acquisition time interval without causing delay in rendering or the like.

SUMMARY

In order to accomplish the above-described object, a first aspect of the present application relates to an optical spectrum analyzer for generating dispersed light beams having particular wavelengths from incident light by adjusting an angle at a diffraction grating, and generating an optical spectrum of the incident light, based on intensities of the dispersed light beams, the optical spectrum analyzer including: a data memory for storing target angle data as data of angles of a diffraction grating, the angles being predetermined by sampling wavelengths to be generated; a trigger signal generating unit configured to generate a trigger signal when one piece of the target angle data and an angle of the diffraction grating substantially match each other; and a calculator unit configured to generate an optical spectrum of the incident light, based on optical intensities of the dispersed light beams at a time of generation of the trigger signal; and an FIFO memory for storing part of the target angle data, and for updating the target angle data used by the trigger signal generating unit, each time the trigger signal is generated, wherein the calculator unit is configured to read a plurality of pieces of the target angle data at a time from the data memory to output the read pieces of target angle data to the FIFO memory.

BRIEF DESCRIPTION OF THE DRAWINGS

The foregoing and other objects, features, aspects and advantages of the invention will become more apparent from the following detailed description when taken in conjunction with the accompanying drawings, in which.

DESCRIPTION OF EMBODIMENTS

Preferred embodiments of the present application will be described below with reference to the accompanying drawings, in which like reference characters designate similar or identical parts throughout the several diagrams thereof.

A first aspect of the present application relates to an optical spectrum analyzer for generating dispersed light beams having particular wavelengths from incident light by adjusting an angle at a diffraction grating, and generating an optical spectrum of the incident light, based on intensities of the dispersed light beams, the optical spectrum analyzer including: a data memory for storing target angle data as data of angles of a diffraction grating, the angles being predetermined by sampling wavelengths to be generated; a trigger signal generating unit configured to generate a trigger signal when one piece of the target angle data and an angle of the diffraction grating substantially match each other; and a calculator unit configured to generate an optical spectrum of the incident light, based on optical intensities of the dispersed light beams at a time of generation of the trigger signal; and an FIFO (First-In First-Out) memory for storing part of the target angle data, and for updating the target angle data used by the trigger signal generating unit, each time the trigger signal is generated, wherein the calculator unit is configured to read a plurality of pieces of the target angle data at a time from the data memory to output the read pieces of target angle data to the FIFO memory.

A second aspect of the present application relates to the optical spectrum analyzer of the first aspect of the present application, in which the data memory is included in the calculator unit.

A third aspect of the present application relates to the optical spectrum analyzer of the first aspect of the present application, in which the calculator unit inputs the target angle data to the FIFO memory, when a remaining data amount of the FIFO memory reaches a predetermined value or lower.

A fourth aspect of the present application relates to the optical spectrum analyzer of the third aspect of the present application, in which the FIFO memory outputs an interrupt signal to the calculator unit, when the remaining data amount of the FIFO memory reaches the predetermined value or lower, and upon receiving the interrupt signal, the calculator unit outputs the target angle data to the FIFO memory.

A fifth aspect of the present application relates to the optical spectrum analyzer of the first aspect of the present application, in which the calculator unit performs the output of the target angle data to the FIFO memory during a polling period.

A sixth aspect of the present application relates to the optical spectrum analyzer of the first aspect of the present application, further including a display unit to display the generated optical spectrum.

In the first aspect of the present application, the optical spectrum analyzer includes: a data memory for storing target angle data as data of angles of a diffraction grating, the angles being predetermined by sampling wavelengths to be generated; a trigger signal generating unit configured to generate a trigger signal when one piece of the target angle data and an angle of the diffraction grating substantially match each other; and a calculator unit configured to generate an optical spectrum of the incident light, based on optical intensities of the dispersed light beams at a time of generation of the trigger signal; and an FIFO memory for storing part of the target angle data, and for updating the target angle data used by the trigger signal generating unit, each time the trigger signal is generated, wherein the calculator unit is configured to read a plurality of pieces of the target angle data at a time from the data memory to output the read pieces of target angle data to the FIFO memory.

Thus, an optical spectrum analyzer can be obtained which allows for reduction of costs and time required to start the measurement by, for example, reducing hardware such as the SRAM, and also for shortening of the data acquisition time interval without causing delay in rendering and the like.

In the second aspect of the present application, the data memory is included in the calculator unit.

This allows for further simplification of the configuration of the optical spectrum analyzer, thus reduction in cost.

In the third aspect of the present application, the calculator unit inputs the target angle data to the FIFO memory, when a remaining data amount of the FIFO memory reaches a predetermined value or lower.

This allows the target angle data to be efficiently updated in accordance with the remaining data amount of the FIFO memory. Since this reduces the load on the calculator unit, a possibility that a delay in rendering or the like occurs can be further reduced.

In the fourth aspect of the present application, the FIFO memory outputs an interrupt signal to the calculator unit, when the remaining data amount of the FIFO memory reaches the predetermined value or lower, and upon receiving the interrupt signal, the calculator unit outputs the target angle data to the FIFO memory.

This allows the optical spectrum analyzer of the third aspect to be achieved easily.

In the fifth aspect of the present application, the calculator unit performs the output of the target angle data to the FIFO memory during a polling period.

This allows the number of interrupts to the calculator unit to be reduced. Accordingly, since the load on the calculator unit is smaller, the possibility that delay in rendering or the like occurs can be further reduced.

In the sixth aspect of the present application, the optical spectrum analyzer further includes a display unit to display the generated optical spectrum.

This can enhance practicality of the optical spectrum analyzer of the first aspect.

Embodiment 1

Figure 1:
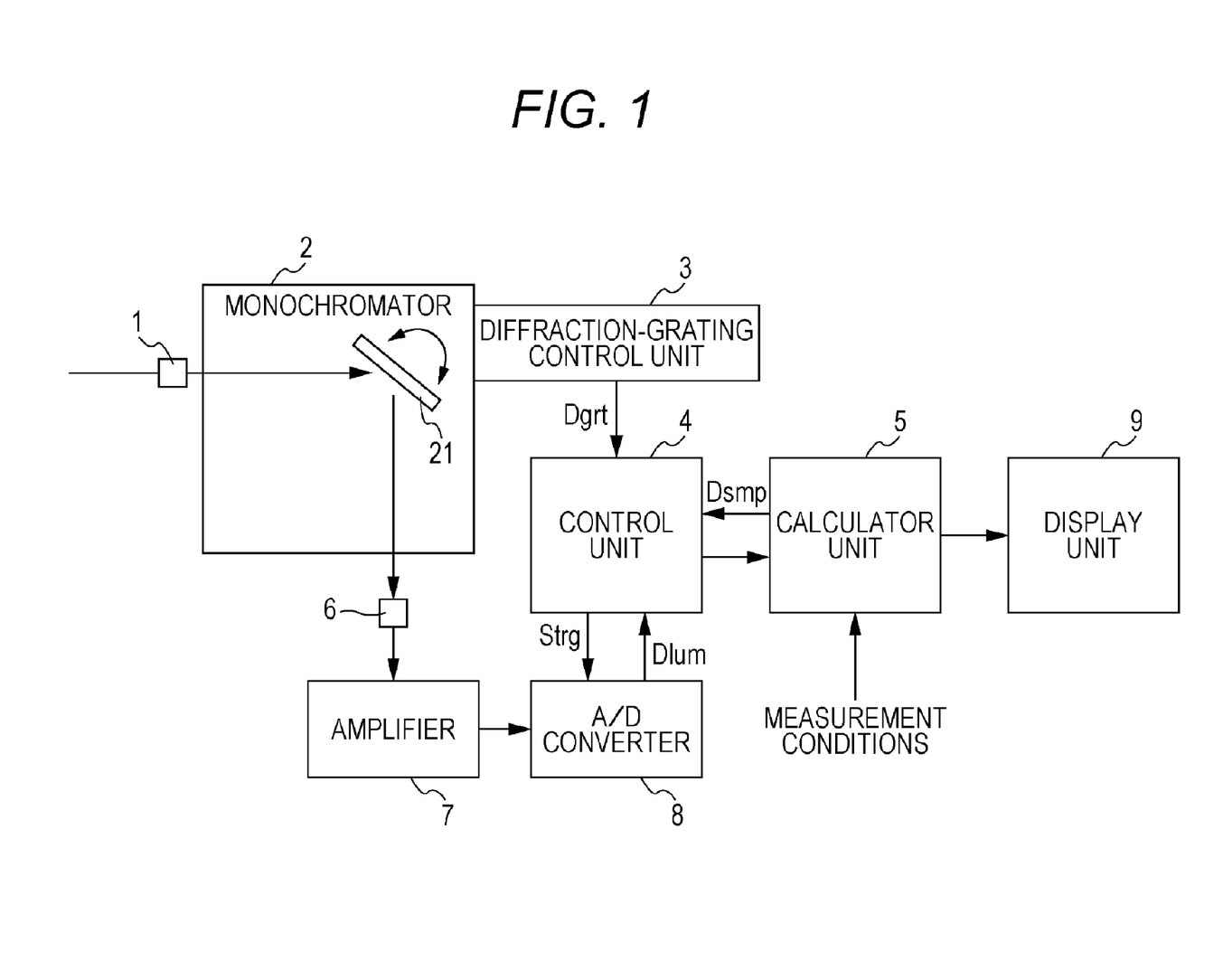
FIG. 1 illustrates a configuration diagram showing one embodiment of an optical spectrum analyzer of the present application.

FIG. 1 illustrates a configuration diagram showing one embodiment of an optical spectrum analyzer according to one aspect of the present application. In this optical spectrum analyzer, the control unit 400 in the conventional example is replaced by a control unit 4, and the calculator unit 500 is replaced by a calculator unit 5, which conventional example is shown in FIG. 3.

The optical spectrum analyzer of the present embodiment includes an input unit 1, a monochromator 2, a diffraction grating 21, an optical receiver 6, an amplifier 7, an A/D converter 8, a diffraction-grating control unit 3, the control unit 4, the calculator unit 5, and a display unit 9. To the monochromator 2 is inputted incident light from the input unit 1. The diffraction grating 21 is included inside the monochromator 2. The optical receiver 6 receives dispersed light beams obtained by the dispersion by the diffraction grating 21. The amplifier 7 amplifies output of the optical receiver 6. The A/D converter 8 A/D-converts the output of the amplifier 7 to thereby measure the optical intensity of the dispersed light beams. The diffraction-grating control unit 3 drives (rotates) the diffraction grating 21. The control unit 4 controls timing of sampling of the optical intensity of the dispersed light beams. The calculator unit 5 generates an optical spectrum, based on sampled optical intensity data. The display unit 9 displays the generated optical spectrum. The calculator unit 5 is a CPU or any other suitable device capable of making the necessary calculations. The control unit 4 is an FPGA for example, or any other suitable device.

The incident light, which is inputted from the input unit 1 to the monochromator 2, is dispersed by the diffraction grating 21 inside the monochromator 2. The dispersed light beams enter the optical receiver 6, and are converted to optical intensity data.

The wavelength of the dispersed light beams depends on the relative angle of the diffraction grating 21 with respect to the incident light. The calculator unit 5 calculates a target diffraction-grating angle corresponding to a sampling wavelength for acquiring the optical intensity, based on set measurement conditions such as sampling start/end wavelengths, the number of measurement points, and the like.

The calculator unit 5 also performs rendering processing for displaying the optical spectrum on the display unit 9, and the like. Thus, the calculator unit 5 is operated by executing an OS (Operating System) such as Windows (registered trademark). The calculator unit 5, therefore, has an internal memory capacity of several 100 Mbytes. Accordingly, the calculator unit 5 allows target diffraction-grating angle data (target angle data) Dsmp of several Mbits to be retained easily on an internal memory. The calculator unit 5 temporarily stores the obtained target diffraction-grating angles on the internal memory of the calculator unit 5. As will be described later, the calculator unit 5 reads part of the target diffraction-grating angle data from this internal memory to write it on a memory inside the control unit 4 before the measurement start.

The diffraction-grating control unit 3 drives the diffraction grating 21 in a range from an angle corresponding to the sampling start wavelength to an angle corresponding to the sampling end wavelength, and transmits a current diffraction-grating angle Dgrt to the control unit 4.

In case where the configuration of the monochromator 2 is Czerny-Turner arrangement, the relationship between the diffraction-grating angle $\theta$ and the wavelength $\lambda$ is as follows:

$$\lambda = 2d/\{m \cdot \cos(a) \cdot \sin\theta\}$$

d: the number of grooves of the diffraction grating
m: the diffraction order
a: (the angle of incident light and outgoing light with respect to the diffraction grating)/2

During the measurement, it is preferred to drive the diffraction grating 21 at a constant speed for vibration suppression. In order to continuously acquire optical intensity data Dlum at regular wavelength intervals, a trigger signal Strg is generated not at constant time intervals but at constant wavelength intervals.

The control unit 4 generates the trigger signal Strg indicating timing of sampling, based on the current diffraction-grating angle Dgrt inputted from the diffraction-grating control unit 3 and the target diffraction-grating angle stored on the memory. The A/D converter 8 receives this trigger signal Strg to acquire the optical intensity data Dlum at the time of the reception.

Figure 2:
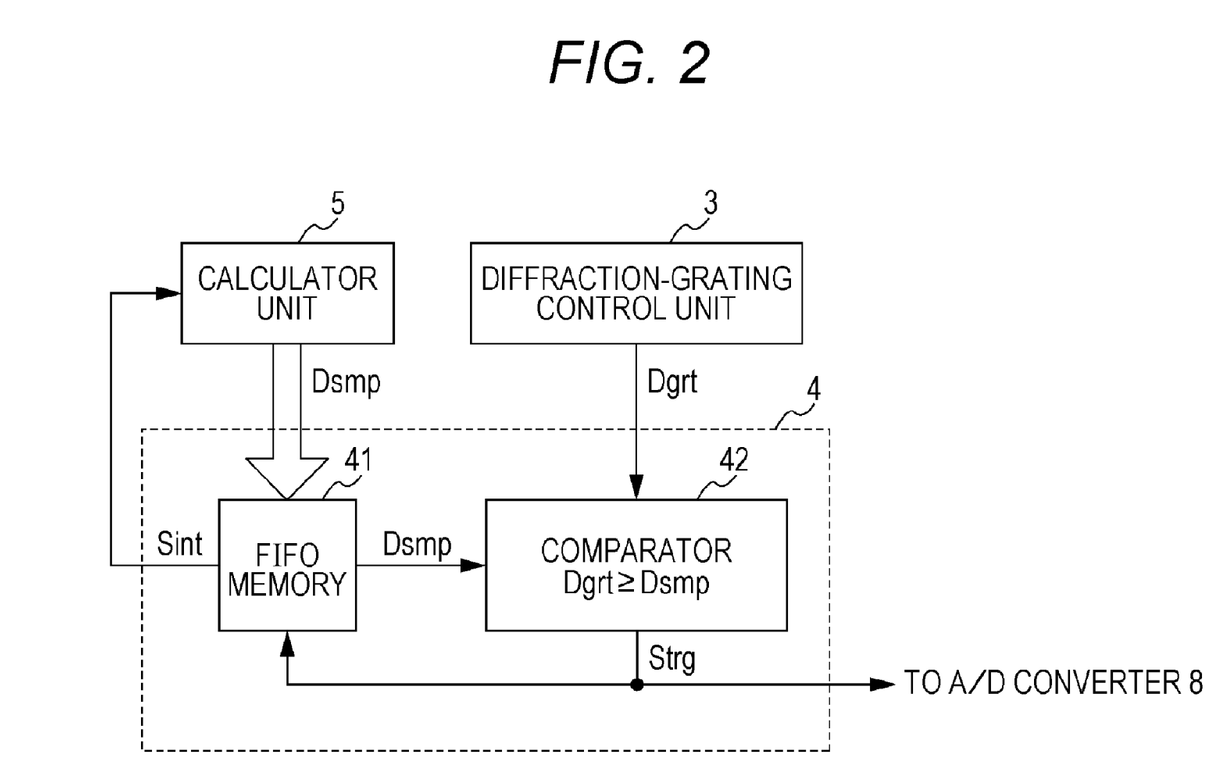
FIG. 2 illustrates a diagram showing a configuration of a control unit of the embodiment shown in FIG. 1.

FIG. 2 illustrates a diagram showing a configuration of the control unit 4. The control unit 4 includes an FIFO memory 41 comprising a plurality of levels deep, and a comparator 42.

Before the measurements start, the target diffraction-grating angle data Dsmp is inputted by the calculator unit 5 until the FIFO memory 41 becomes full. During the measurement, the target diffraction-grating angle data Dsmp accumulated on the FIFO memory 41 is outputted to the comparator 42.

The comparator 42 compares the target diffraction-grating angle data Dsmp inputted from the FIFO memory 41 and the angle information Dgrt indicating the current angle of the diffraction grating 21. When the diffraction-grating angle Dgrt reaches the target diffraction-grating angle, the comparator 42 generates the trigger signal Strg.

The trigger signal Strg is transmitted to the A/D converter 8 and the FIFO memory 41. Upon receiving the trigger signal Strg, the A/D converter 8 acquires the optical intensity Dlum corresponding to the sampling wavelength. Upon receiving the trigger signal Strg, the FIFO memory 41 updates the output data. The FIFO memory 41 supplies the new target diffraction-grating angle data Dsmp corresponding to the next sampling wavelength to the comparator 42.

The comparator 42 compares the updated target diffraction-grating angle data Dsmp and the angle information Dgrt. When the diffraction-grating angle Dgrt reaches the target diffraction-grating angle, the comparator 42 generates the next trigger signal Strg. Upon receiving the trigger signal Strg newly generated, the FIFO memory 41 again updates the target diffraction-grating angle Dsmp.

During the measurement, each time the trigger signal Strg is generated, the data accumulated on the FIFO memory 41 is reduced by one level. When the remaining data amount of the FIFO memory 41 reaches a predetermined value (e.g., half), the FIFO memory 41 outputs an interrupt signal Sint to the calculator unit 5. Upon receiving this interrupt signal Sint, the calculator unit 5 outputs the target diffraction-grating angle data Dsmp to the FIFO memory 41 until the FIFO memory 41 again becomes full.

Repeating the above-described operation allows the trigger signal Strg to be sequentially generated at the timing corresponding to the sampling wavelengths while the diffraction grating 21 is being driven. This enables the optical spectrum to be continuously measured by the number of the measurement points set in advance.

The respective pieces of optical intensity data Dlum acquired by the A/D converter 8 are transmitted to the calculator unit 5 through the control unit 4. The optical spectrum data is generated by the calculator unit 5. The calculator unit 5 further applies correction of a level value to the generated optical spectrum data to generate the display data and display the data on the display unit 9.

The consumption amount of the logic circuitry of the FIFO memory 41 is small. This allows the FIFO memory 41 to be mounted inside the FPGA constituting the control unit 4. Accordingly, in the optical spectrum analyzer, an external large-capacity memory (SRAM or the like) need not be used, unlike the conventional example. This can achieve reduction in mounting area and costs.

Further, in the optical spectrum analyzer, the target diffraction-grating angle data Dsmp at all the measurement points need not be written on the SRAM before the measurement start, unlike the conventional example. This allows for shortening of the time until the measurement start.

Moreover, the limit in the number of measurement points in the conventional example, which limit is attributed to the capacity of the SRAM storing the target diffraction-grating angle data Dsmp, can be eliminated.

One example of effects of the present embodiment is described. In cases where the connection between the control unit 4 and the calculator unit 5 is of a PCI of 33 MHz, and the interrupt processing is performed inside a PCI driver, a time of 8 μs is required for the interrupt processing and time of 1 μs is required for the writing processing, as described above.

In the present embodiment, if the number of levels of the FIFO memory is sixteen, and the interrupt signal Sint is generated when the number of remaining levels becomes eight, which is half, time required per interrupt processing is:

$$8 \text{ μs} + 1 \text{ μs} \times 8 = 16 \text{ μs}.$$

That is, the processing time for one interrupt is about twice as much as when only a register is used. However, since the number of interrupts is ⅛, the load on the calculator unit 5 can be largely reduced as a whole. This prevents the delay in the rendering processing or the like from occurring.

The present embodiment is configured as the foregoing, and the optical spectrum analyzer includes: an internal memory (data memory) for storing target diffraction-grating angle data (target angle data) Dsmp as data of angles of a diffraction grating 21, the angles being predetermined by sampling wavelengths to be generated; a comparator 42 configured to generate a trigger signal Strg when one piece of the target diffraction-grating angle data Dsmp and an angle Dgrt of the diffraction grating 21 substantially match each other; and a calculator unit 5 configured to generate an optical spectrum of the incident light, based on optical intensities of the dispersed light beams at a time of generation of the trigger signal Strg; and an FIFO memory 41 for storing part of the target diffraction-grating angle data Dsmp, and for updating the target diffraction-grating angle data Dsmp used by the comparator 42, each time the trigger signal Strg is generated, wherein the calculator unit 5 is configured to read a plurality of pieces of the target diffraction-grating angle data Dsmp at a time from the internal memory to output the read pieces of target diffraction-grating angle data Dsmp to the FIFO memory 41.

Thus, an optical spectrum analyzer is obtained which allows for reduction of costs and time until measurement start by, for example, reducing the hardware such as an SRAM, and also for shortening of data acquisition time intervals without causing a delay in rendering or the like.

The internal memory can be included in the calculator unit 5. This allows for further simplification of the configuration of the optical spectrum analyzer, thus reduction in cost.

The calculator unit 5 inputs the target diffraction-grating angle data Dsmp to the FIFO memory 41, when a remaining data amount of the FIFO memory 41 reaches a predetermined value or lower.

Moreover, the FIFO memory 41 outputs an interrupt signal to the calculator unit 5, when the remaining data amount of the FIFO memory 41 reaches the predetermined value or lower, and upon receiving the interrupt signal, the calculator unit 5 outputs the target diffraction-grating angle data Dsmp to the FIFO memory 41.

This enables the target diffraction-grating angle data Dsmp to be efficiently updated in accordance with the remaining data amount of the FIFO memory 41. This reduces the load on the calculator unit 5, thus further reducing a possibility that a delay in rendering or the like occurs.

The optical spectrum analyzer of the embodiments further includes a display unit 9 to display the generated optical spectrum. This can enhance practicality of the optical spectrum analyzer.

In the present embodiment, the FIFO memory 41 updates the target diffraction-grating angle data Dsmp in accordance with the remaining data amount. However, the present application is not limited thereto, and in case where the FIFO memory 41 has a sufficiently large capacity, the target diffraction-grating angle data Dsmp may be inputted to the FIFO memory 41 during a polling period of the calculator unit 5 before the interrupt signal Sint is outputted. This allows for reduction in the number of interrupts to the calculator unit 5. This renders the load on the calculator unit 5 less, thus further reducing the possibility that a delay in rendering or the like is caused.

Moreover, in some configurations of the monochromator 2, it is preferred to move an optical slit for adjusting the resolution and the optical intensity in accordance with the diffraction grating angle. For the movement of the optical slit, a stepping motor may be used. One aspect of the present application is applicable to the generation of a drive pulse to drive this motor.

That is, in this case, the target diffraction-grating angle data to generate the drive pulse is stored on the FIFO memory. When the current diffraction-grating angle reaches the target diffraction-grating angle data outputted from the FIFO, the drive pulse of the stepping motor is generated. After the generation of the drive pulse, the output data from the FIFO memory is updated. Moreover, when the remaining data amount of the FIFO memory reaches a predetermined value or lower, the subsequent target diffraction-grating angle data is inputted to the FIFO memory.

Furthermore, wavelength characteristics of a passive device such as a filter can be measured by combining a wavelength-variable light source and a power meter. The wavelength-variable light source adjusts the angle of the diffraction grating or a mirror by driving the diffraction grating or the mirror disposed so as to be paired with the diffraction grating, and outputs light of a wavelength in accordance with this angle. In the wavelength characteristic measurement in this case, in case where the wavelength of the outputted light from the wavelength-variable light source matches the measurement wavelength, a trigger signal is outputted to the power meter. The wavelength of the outputted light corresponds to the angle data. Thus, the output of the trigger signal to the power meter is also configured similarly to the optical spectrum analyzer according to one aspect of the present application. Therefore, one aspect of the present application is also applicable to the configuration in which the wavelength characteristics of the passive device are measured.

The comparator 42 corresponds to a trigger signal generating unit.

The optical spectrum analyzer of one aspect of the present application may be represented as the following first to third optical spectrum analyzers.

A first optical spectrum analyzer for measuring an optical spectrum of incident light by dispersing the incident light into a specific wavelength component and measuring an intensity of the dispersed light, the optical spectrum analyzer includes: a diffraction grating for extracting the specific wavelength component from the incident light and outputting the wavelength component as a dispersed light beam; a diffraction-grating control unit configured to drive this diffraction grating to change a relative angle between the diffraction grating and the incident light, to change a wavelength of the dispersed light beam; a light detecting unit configured to detect the optical intensity of the dispersed light beam; a calculator unit configured to calculate a target diffraction-grating angle such that the wavelength component extracted by the diffraction grating has a sampling wavelength at which the optical intensity of the dispersed light beam be detected, and to store the calculated target diffraction-grating angle data on an internal memory; an FIFO memory configured such that part of the target diffraction-grating angle data stored on the internal memory is inputted to, for outputting the target diffraction-grating angle data, each time the FIFO memory receives a trigger signal indicating timing of sampling; a trigger signal generating unit configured to generate the trigger signal, based on the target diffraction-grating angle data outputted from this FIFO memory and the angle of the diffraction grating; and an FIFO memory control unit configured to read the subsequent target diffraction-grating angle data from the internal memory to output the subsequent data to the FIFO memory, when a remaining data amount of the FIFO memory reaches a predetermined value or lower.

Thus, an optical spectrum analyzer can be obtained which allows for reduction of costs and time required to start the measurement by, for example, reducing hardware such as the SRAM, and also for shortening of the data acquisition time interval without causing delay in rendering and the like.

A second optical spectrum analyzer relates to the first optical spectrum analyzer, in which the FIFO memory control unit outputs the interrupt to the calculator unit, when the remaining data amount of the FIFO memory reaches the predetermined value or lower, and upon receiving the interrupt, the calculator unit outputs the target diffraction-grating angle data to the FIFO memory.

This allows the target diffraction-grating angle data to be efficiently updated in accordance with the remaining data amount of the FIFO memory. Since this reduces the load on the calculator unit, a possibility that a delay in rendering or the like occurs can be further reduced.

A third optical spectrum analyzer relates to the first optical spectrum analyzer, in which the FIFO memory control unit inputs the target diffraction-grating angle data to the FIFO memory during the polling period of the calculator unit.

This allows for reduction of the number of interrupts to the calculator unit. Accordingly, since the load on the calculator unit is smaller, the possibility that delay in rendering or the like occurs can be further reduced.

While the invention has been illustrated and described in detail, the foregoing description is in all aspects illustrative and not restrictive. It is therefore understood that numerous modifications and variations can be devised without departing from the spirit and scope of the invention.

What is claimed is:

1. An optical spectrum analyzer for generating dispersed light beams having particular wavelengths from incident light, and measuring an optical spectrum of the incident light by measuring intensities of the dispersed light beams, the optical spectrum analyzer comprising:

a diffraction grating to extract and output a component light of a particular wavelength;

a diffraction grating controller to change the wavelength of the component light by driving the diffraction grating to change the relative angle with the incident light;

a light detector to detect light intensity of the component light;

a calculator configured to calculate a target diffraction grating angle data where a wavelength component extracted by the diffraction grating becomes a sampling wavelength of the component light to detect intensity, and to store the calculated target diffraction grating angle data in an inner memory; and a FIFO memory to receive a part of the target diffraction grating angle data stored in the inner memory, and output the target diffraction grating angle data each time a trigger signal indicating timing of sampling is generated, a trigger signal generator configured to generate the trigger signal based on the target diffraction grating angle data output by the FIFO memory and an angle of the diffraction grating;

a FIFO memory controller configured to read continuing target diffraction grating angle data from the inner memory and input the continuing target diffraction grating angle data into FIFO when an amount of target diffraction grating angle data remaining in FIFO reaches a set value or less, wherein the FIFO memory controller inputs the continuing target diffraction grating angle data to FIFO memory during a polling period of the calculator.

2. The optical spectrum analyzer according to claim 1, wherein the inner memory is included in the calculator.

3. The optical spectrum analyzer according to claim 1, wherein the FIFO memory outputs an interrupt signal to the calculator, when the amount of the FIFO memory reaches the set value or less, and upon receiving the interrupt signal, the calculator outputs the target diffraction grating angle data to the FIFO memory.

4. The optical spectrum analyzer according to claim 1, wherein the calculator performs the output of the target diffraction grating angle data to the FIFO memory during a polling period.

5. The optical spectrum analyzer according to claim 1, further comprising a display to display the generated optical spectrum.

\* \* \* \* \*